US009996936B2

(12) United States Patent
Arth et al.

(10) Patent No.: US 9,996,936 B2
(45) Date of Patent: Jun. 12, 2018

(54) PREDICTOR-CORRECTOR BASED POSE DETECTION

(71) Applicant: QUALCOMM Incorporated, San Diego, CA (US)

(72) Inventors: Clemens Arth, Judendorf-Straßengel (AT); Paul Wohlhart, Sunnyvale, CA (US); Vincent Lepetit, Graz (AT)

(73) Assignee: QUALCOMM Incorporated, San Diego, CA (US)

(*) Notice: Subject to any disclaimer, the term of this patent is extended or adjusted under 35 U.S.C. 154(b) by 139 days.

(21) Appl. No.: 15/161,055

(22) Filed: May 20, 2016

(65) Prior Publication Data
US 2017/0337690 A1 Nov. 23, 2017

(51) Int. Cl.
G06T 17/00 (2006.01)
G06T 7/10 (2017.01)
G06T 7/50 (2017.01)
G06T 7/174 (2017.01)
G06T 7/136 (2017.01)

(52) U.S. Cl.
CPC ............... *G06T 7/10* (2017.01); *G06T 7/136* (2017.01); *G06T 7/174* (2017.01); *G06T 7/50* (2017.01); G06T 2207/30244 (2013.01)

(58) Field of Classification Search
CPC .................. G06T 2207/30244; G06T 7/75
See application file for complete search history.

(56) References Cited

U.S. PATENT DOCUMENTS 5,850,469 A 12/1998 Martin et al.
6,985,620 B2 1/2006 Sawhney et al.
2005/0265583 A1 12/2005 Covell et al.
2012/0201469 A1 8/2012 Livet et al.
2013/0077854 A1 3/2013 Kobayashi et al.
2014/0105486 A1 4/2014 Tamaazousti et al.
2017/0116498 A1* 4/2017 Raveane ............... G06K 9/6257

FOREIGN PATENT DOCUMENTS

EP 2840550 A1 2/2015

OTHER PUBLICATIONS

Arth C., "Instant Outdoor Localization and SLAM Initialization from 2.5D Maps," IEEE Transactions on Visualization and Computer Graphics, vol. 21 (11), Sep. 29, 2015, pp. 1309-1318, XP055343176, DOI: 10.11 09/TVCG.2015.2459772.
International Search Report and Written Opinion—PCT/US2017/026834—ISA/EPO—dated Jun. 7, 2017, 14 pages.
Jaynes C., et al., "Pose Calibration Using Approximately Planar Urban Structure", Asian Conference on Computer Vision, Jan. 1, 1999, 7 pages, XP055073770.

* cited by examiner

Primary Examiner — Brian Werner
(74) Attorney, Agent, or Firm — Austin Rapp

(57) ABSTRACT

A computer-implemented method, apparatus, computer readable medium and mobile device for determining a 6DOF pose from an input image. The process of determining 6DOF pose may include processing an input image to create one or more static representations of the input image, creating a dynamic representation of the input image from an estimated 6DOF pose and a 2.5D reference map, and measuring correlation between the dynamic representation and the one or more static representations of the input image. The estimated 6DOF may be iteratively adjusted according to the measured correlation error until a final adjusted dynamic representation meets an output threshold.

20 Claims, 9 Drawing Sheets

PREDICTOR-CORRECTOR BASED POSE DETECTION

TECHNICAL FIELD

This disclosure relates generally to computer vision based pose detection, and more specifically to predictor-corrector based pose detection.

BACKGROUND INFORMATION

Position and orientation (pose) estimation describes the task of calibration or alignment of a camera viewpoint with respect to an environment, which may be known or unknown. Image based pose estimation methods are useful for estimating a six degrees of freedom (6DOF) pose. Image based pose estimation traditionally requires some reconstruction or 3D model of the scene. For example, SLAM (simultaneous location and mapping) or SFM (structure from motion) systems can reconstruct three-dimensional (3D) points from incoming image sequences captured by a camera and are used to build a 3D map of a scene (i.e., a SLAM map) in real-time. From the reconstructed map, it is possible to localize a camera's 6DOF pose in a current image frame.

Accurate 6DOF self-localization with respect to the user's environment is beneficial for correct and visually pleasing results in Augmented Reality (AR) applications. Due to the interactive nature of AR applications, localization time has a direct impact on the user experience of an AR application, because it determines how long the user must wait before interaction with the AR application may start. Thus, it is desirable to localize a mobile device quickly with the limited processing power found in mobile devices, while maintaining accuracy in the 6DOF pose for the desired application.

However, 6DOF pose initialization may be difficult to achieve in certain scenarios. For example, in outdoor environments capturing sufficient camera baseline to initialize the SLAM algorithms is challenging. Additionally, SLAM may provide relative poses in an arbitrary referential with unknown scale, which may not be sufficient for AR systems such as navigation or labeling of landmarks. Existing methods to align the local referential of a SLAM map with the global referential of a 3D map with metric scale have required the user to wait until the SLAM system has acquired a sufficient number of images to initialize the 3D map. The waiting required for initialization is not ideal for real-time interactive AR applications. Furthermore, certain AR systems require specific technical movements of the camera to acquire a series of images before the SLAM map can be accurately initialized to start tracking the camera pose.

Additionally, methods to align a captured image frame with a 2.5D or 3D map may be limited by the relatively poor accuracy of mobile sensors in estimating the camera pose. For example, an approach using strictly a Global Positioning System (GPS) to estimate the actual position and viewing direction of a user may be insufficient and leave AR content floating around in the actual user view. Therefore, improved methods are desirable.

BRIEF SUMMARY

Some embodiments discussed herein provide for improved 6DOF pose acquisition. In one aspect, a computer-implemented method includes: creating one or more static representations of an input image; creating a dynamic representation of the input image from an estimated 6DOF pose and a 2.5D reference map measuring a correlation error between the dynamic representation and the one or more static representations; adjusting, the estimated 6DOF pose according to the correlation error; updating the dynamic representation according to the adjusted 6DOF pose; and outputting the adjusted 6DOF pose in response to meeting an output threshold.

In another aspect, a computer-readable medium includes program code stored thereon for determining a 6DOF pose of an image. The program code includes instructions to: create one or more static representations of an input image; create a dynamic representation of the input image from an estimated 6DOF pose and a 2.5D reference map; measure a correlation error between the dynamic representation and the one or more static representations; adjust the estimated 6DOF pose according to the correlation error; update the dynamic representation according to the adjusted 6DOF pose; and output the adjusted 6DOF pose in response to meeting an output threshold.

In yet another aspect, a mobile device includes memory coupled to a processing unit. The memory is adapted to store program code for determining a 6DOF pose of an image and the processing unit is configured to access and execute instructions included in the program code. When the instructions are executed by the processing unit, the processing unit directs the apparatus to: create one or more static representations of an input image; create a dynamic representation of the input image from an estimated 6DOF pose and a 2.5D reference map; measure a correlation error between the dynamic representation and the one or more static representations; adjust the estimated 6DOF pose according to the correlation error; update the dynamic representation according to the adjusted 6DOF pose; and output the adjusted 6DOF pose in response to meeting an output threshold.

In a further aspect, an apparatus includes: means for creating one or more static representations of an input image; means for creating a dynamic representation of the input image from an estimated 6DOF pose and a 2.5D reference map measuring a correlation error between the dynamic representation and the one or more static representations; means for adjusting, the estimated 6DOF pose according to the correlation error; means for updating the dynamic representation according to the adjusted 6DOF pose; and means for outputting the adjusted 6DOF pose in response to meeting an output threshold.

The above and other aspects, objects, and features of the present disclosure will become apparent from the following description of various embodiments, given in conjunction with the accompanying drawings and appendices.

DETAILED DESCRIPTION

Reference throughout this specification to "one embodiment," "an embodiment," "one example," or "an example," means that a particular feature, structure, or characteristic described in connection with the embodiment or example is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Any example or embodiment described herein is not to be construed as preferred or advantageous over other examples or embodiments.

In one embodiment, a predictor-correlator pose detection method, module, or apparatus enables 6DOF pose detection from an input image of an environment (e.g., an outdoor urban environment). Predictor-correlator pose detection (e.g., at a mobile device) may determine the position and location of the device in an environment/world from the input image and from data from one or more sensors/receivers (e.g., Satellite Positioning Systems (SPS), magnetometer, gyroscope, accelerometer, or others). Image and sensor data may be retrieved and processed at the device. Image and sensor data may be processed with a 2D map and building height data. For example, a 2D floor plan or city map. In one embodiment, the device creates one or more static representations of the input image and a dynamic representation. In one embodiment, the device measures correlation between the one or more static representations and the dynamic representation. In response to determining an error difference between the correlation of the static representations and the dynamic representation, the estimated 6DOF is adjusted over a series of iterations until a refined 6DOF pose is determined. The refined 6DOF pose of the device (e.g., mobile device camera pose at the time of the input image capture), may be used to initialize a 3D map, such as the 3D map in a SLAM (simultaneous location and mapping) or SFM (structure from motion) system, or the 6DOF pose may be passed/sent on to another process, device, or system.

Figure 1:
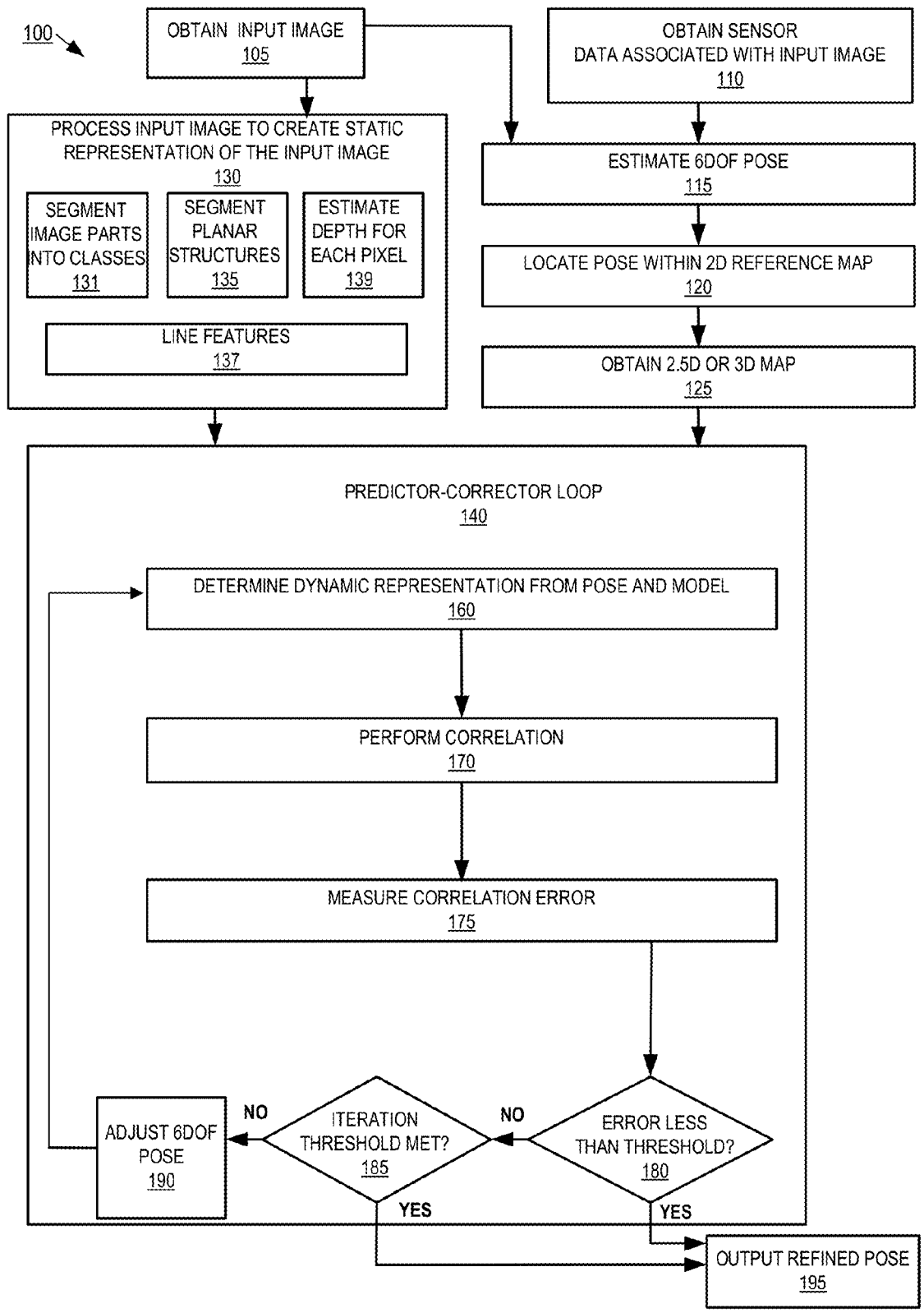
FIG. 1 is a flowchart illustrating a method for a device to determine 6DOF pose of an input image, in one embodiment.

FIG. 1 is a flowchart illustrating a method to determine 6DOF pose of an input image, in one embodiment. At block 105, the method (method 100) obtains an input image. The input image may be a photograph captured by a device's camera sensor, or may be an image frame captured from a video stream. In one embodiment, the input image is a Red Green Blue (RGB) image from a color camera. In some embodiments the input image may be a depth image, thermal image, or other type of image.

At block 110, the method receives sensor data associated with the input image. For example, the image may be tagged or otherwise associated with satellite positioning system coordinates, accelerometer data, compass heading, magnetometer readings, gyroscope data, or any combination thereof.

At block 115, the method estimates 6DOF pose. The method may use the captured image and mobile sensors (e.g., sensors to provide data of block 110 above) to determine a coarse initial 6DOF pose estimate. For example, using fused compass and accelerometer input can provide a full 3×3 rotation matrix with respect to north/east and the earth center and may be augmented with the Global Navigation Satellite System (GNSS) such as Global Positioning System (GPS) information in coordinates to create a pose matrix (e.g., a 3×4 pose matrix). A mapping system running on a mobile may be used to estimate the initial 6DOF pose of the camera with respect to the environment. For example, the image and initial sensor pose may be determined from the captured image and SFM or SLAM localization.

At block 120, the method locates pose (e.g., of the input image) within a 2D reference map. The 6DOF pose estimate from block 115 may be used to identify a part of a 2D reference map (e.g. OpenSceneMap® or Google Maps®) of an urban environment. In some embodiments, the sensor data may be used to register an estimated 6DOF pose to the 2D reference map. For example, by leveraging mobile device sensors, a unique area identification in the environment may be possible, such as identifying aspects of an environment according to GPS determined location that places the device within a section of the 2D reference map. The device may identify portions or objects of the environment that are likely visible in the image (e.g., by determining compass reading/view direction). In some embodiments, the 2D reference map is a pie tile of a map composed from approximate position and viewing direction, together with an assumption of the field of view of the camera (e.g. 60° for some smartphones) and an approximate maximum distance threshold (e.g. buildings more than "x" number of meters away are considered occluded or not visible).

At block 125, the method obtains a 2.5D or 3D map. In some embodiments, method 100 extrapolates/creates a height information for objects/building in the 2D reference map to create a 2.5D map (e.g., 2D map that includes building height data). In some embodiments, method 100 may generate a 2.5D model of the environment by extrapolating the ground plot using a certain assumption about the height of surrounding buildings. Height of environment objects may be purely guessed or may be known from other sources, such as aerial Light Detection And Ranging (LIDAR). In one embodiment, 2D and building height data may be retrieved from a source such as OpenStreetMap® or other map data source. In some embodiments, the device may extrude 2D maps of surroundings from a map dataset with a course estimate of the height of the building façades. For example, OpenStreetMap® data consists of oriented line strips, which may be converted into a triangle mesh including face normal. Each building façade plane may be modeled as 2D quad with four vertices, two ground plane vertices and two roof vertices. The heights of the vertices may be taken from a source such as aerial laser scan data. Vertical building outlines may be aligned to a global vertical up-vector.

In other embodiments, the device registers the input image to a previously created untextured 2.5D map (e.g., 2D building footprints and approximate building height). Alternatively, if a full 3D map is available (e.g., retrieving computer-aided design drawings or other more detailed models for an area), a part of the 3D map may be identified from the input image for registration to the 3D map.

At block 130, method processes the input image to create one or more static (e.g., alternative or new) representations of the input image. As used herein, static representations do not change after creation at block 130. In contrast, the dynamic representation of the input image as described below at block 160 will be iteratively changed through the predictor-corrector loop 140. The input image may be used to generate a plurality of separate/distinct static representations. In some embodiments, each static representation at block 130 may be created in parallel, before, or after one or more of the prior described blocks (e.g., block 110-125). Some example static representations may include one or more of segmenting parts of the image into class segments (e.g., block 131), segmenting the image into planar structures (e.g., block 135), estimating depth for each pixel (e.g., block 139), to name a few but not all possible representations. The amount or type of representations to create may be determined according to a user configuration, and/or automatically configured according to available processing power on a mobile device.

At block 131, the method may segment of the image into classes (e.g., segments or parts) belonging to the building and those, which belong to other classes. In one embodiment the device to segment the image into parts may use a convolutional neural network (CNN) or a support Vector Machine (SVM). In one embodiment, classes may be determined according to a simple pixel-wise segmentation of the input image, for example by applying a classifier to patches of the image having a given size and assigning a class label to the center location of the patch. In some embodiments, the class segmentation process may use a multi-class SVM trained on a dataset of manually segmented images. In one embodiment, a device uses integral features and considers one or more of five different classes $C=\{c_f, c_s, c_r, c_v, c_g\}$ for façade, sky, roof, vegetation and ground, respectively. In other embodiments the amount and type of classes considered may be different than for this illustrative example. For example, some implementations may have classes for windows, cars, doors, entire houses, or other user configurable classes.

At block 135, the method segments the image into planar structures. Planar structure segmentation (e.g., as illustrated and described in FIG. 2D below) may be determined by identifying the normal vectors of pixels within the planar structures. Segmentation of planar structures may be done based on the input image, or optionally as a result of processing multiple subsequent frames taken from the same approximate viewpoint (e.g. through using optical flow or accidental motion).

At block 137, the method extracts a plurality of line features from the input image. Extracted line features or segments (e.g., as illustrated and described in FIG. 2C below) may be filtered according to one or more of: length, relationship to a horizon, projection angle, or any combination thereof. In some embodiments, the line segments are used to create a line detection histogram, which summarizes the presence of lines along the vertical and horizontal axes of the image by summing up the individual pixels detected as lines in y, respectively x direction. In some embodiments, the line detection routine is based on Hough transform and thresholding. In other embodiments, the line detection routine is based on the LSD (line-segment-detector).

At block 139, the method creates a depth map or vector field for each pixel in the input image. A depth map (e.g., as illustrated and described in FIG. 2E below) may be an image or image channel comprising distance data for the surfaces of objects from a viewpoint. Measurement of depth in a depth map may be in relation to a camera's axis (i.e., Z axis) for the view of a camera (as compared to the absolute Z axis of a scene). In one embodiment, the depth map or vector field is created from estimating depth from multiple image viewpoints. In another embodiment, the depth may be from a learned or trained model which may retrieve additional information to estimate depth for each pixel. In yet another embodiment, the depth data at block 139 may be determined from a depth image, for example if the input image is a depth image the depth data may simply be referenced directly from the input image.

Estimating depth for each pixel may be determined from optical flow or accidental motion. In some embodiments, the depth estimate might be created by inferring depth estimates from accidental motion between successive frames and statistical models describing this motion with respect to the observed 3D structure. In some embodiments the depth image may be generated from estimating the optical flow of individual pixels in successive frames and an estimation of the depth using the inferred motion from optical flow.

At block 140, the method initiates a predictor-corrector loop. The predictor-corrector loop may utilize the one or more static representations of block 130, the 2.5D or 3D model from 125, and pose 115 as a starting point.

At block 160, the method determines a dynamic representation from the camera pose estimate of the input image from block 115 and the 2.5D or 3D map/model from block 125. In one embodiment, the dynamic representation is compatible with the selected one or more static representations of block 130. For example, if the static representation is a depth map (e.g., depth map 139) the dynamic representation may be created as a matrix of depth values representing the distance of the objects in the model of block 125 to the camera pose from block 115. In one embodiment, when correlating to a static representation depth map or normal vector map, the dynamic representation may also be a depth map or normal vector map such that depth is correlated with depth, or normal vectors with normal vectors. In other embodiments, the dynamic representation is a representation which may be correlated with image classes 131, planar structures 135, line features 137, or other static representations that may be determined in block 130. In some embodiments, the device creates a dynamic representation from the model and 6DOF pose for visualization purposes (e.g., to display on a device or output to an application or program).

At block 170, the method measures correlation between the one or more static representations and a dynamic representation. For example, a convolutional neural network may be utilized to determine correlation between a dynamic representation and the one or more static representations of the input image. In some embodiments, if two or more static representations are determined or provided, each static representation may have an output weight associated with its correlation error result to a dynamic representation. In some embodiments, in response to correlating the available static representation(s) with a dynamic representation, an iteration counter is incremented. The iteration counter may be used to set a maximum number of iterations to perform the correlation before a 6DOF pose output is provided.

At block 175, the method measures correlation error from the result of block 170. In some embodiments, the correlation result may be represented as a correlation or correlation measurement value. In some embodiments, the lower the correlation error, the higher the correlation between the static representations and the dynamic representation, and the resulting refined 6DOF pose will be more accurate. In other embodiments, the lower the correlation error, the lower the correlation between the static representations and the dynamic representation, and the resulting refined 6DOF pose will be more accurate.

At block 180, the method determines if the correlation error is less than a threshold (e.g., a configurable correlation error threshold), then the method outputs a refined pose at block 190. Otherwise, if the correlation error is greater than a threshold the device determines whether the iteration counter introduced at block 170 meets an iteration threshold at block 185. If the iteration threshold is met, the device will output the refined pose at 195. If the iteration threshold is not met, the device creates an updated/adjusted pose at block 190 and performs another predictor-corrector iteration at block 140. In some embodiments, either a correlation error meeting the correlation error threshold, and/or the iteration count threshold being met results in the output of a refined pose at block 190. In some embodiments, a combination of the correlation error and iteration counter comprises an output threshold that determines whether additional iterations of the predictor-corrector loop 140 should be triggered.

Figure 2A:
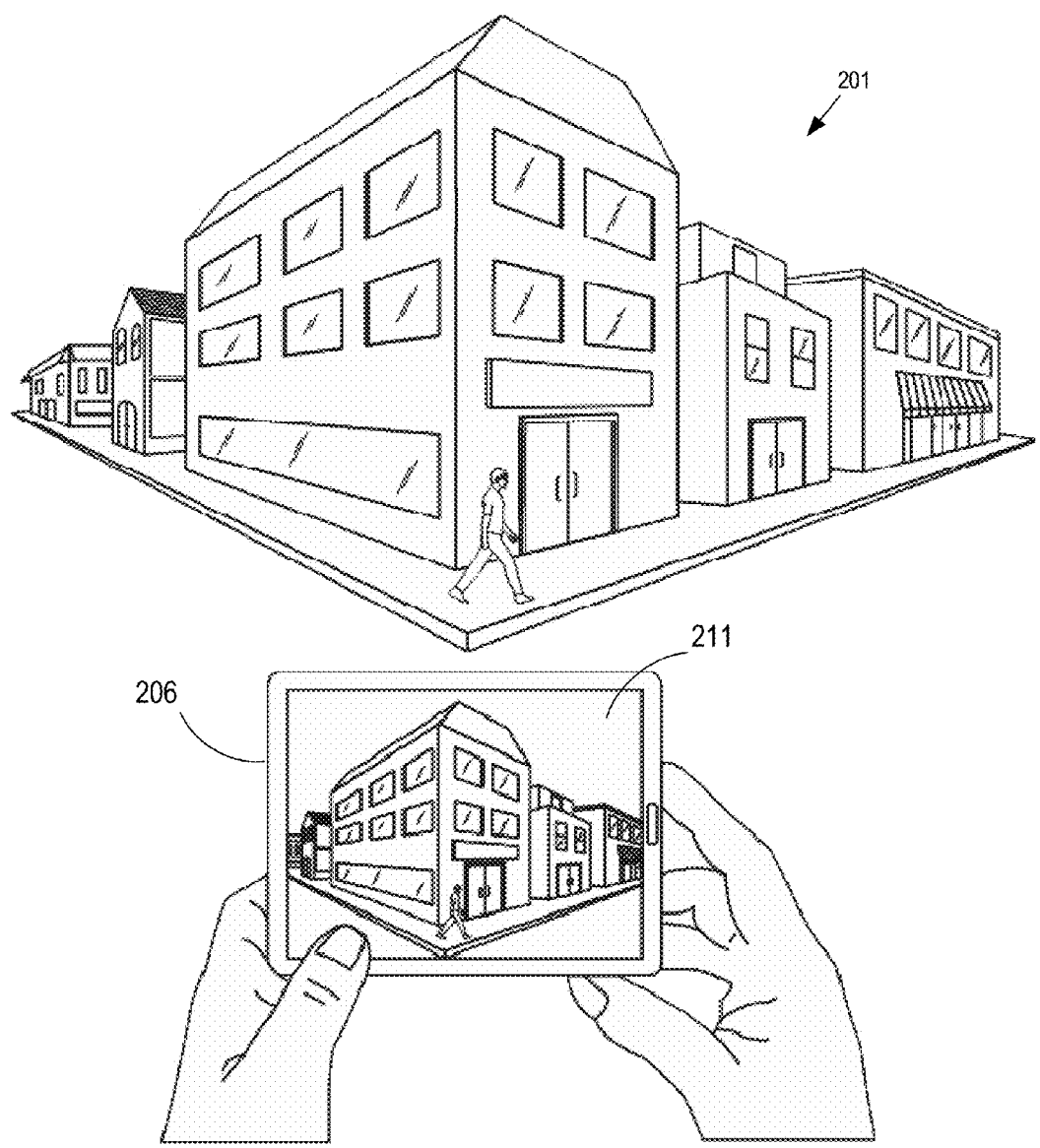
FIG. 2A illustrates an operating environment for determining a 6DOF pose, in one embodiment.

FIG. 2A illustrates an operating environment for determining a 6DOF pose, in one embodiment. Scene 201 represents an urban outdoor scene from the viewpoint of mobile device 206. In some embodiments, the mobile device 206 may display a representation of the environment (e.g., an urban outdoor scene). For example, the mobile device may display a real time view 211 that may include graphical overlays or information related to the scene.

Figure 2B:
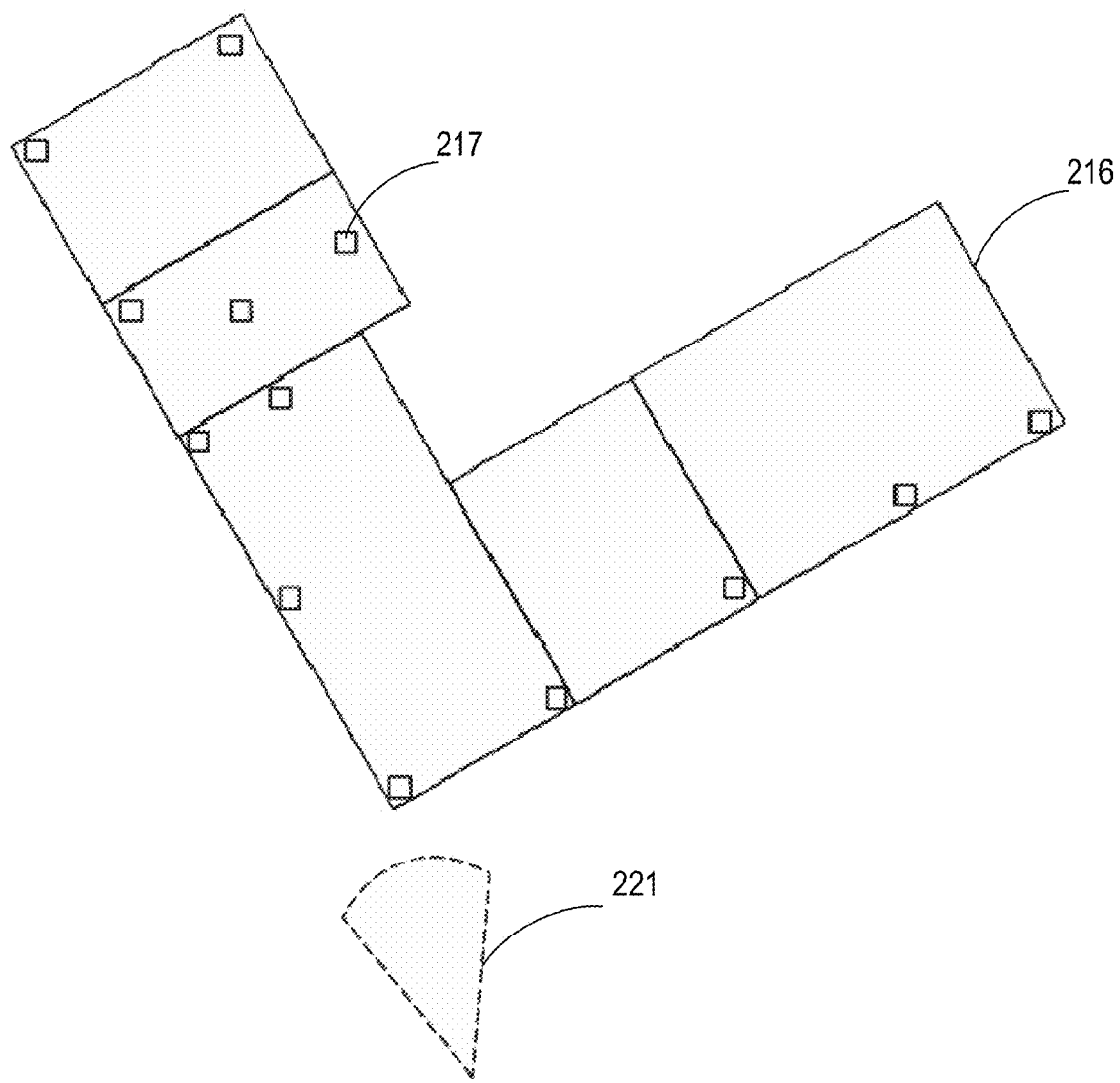
FIG. 2B illustrates a topographical map used as input to create a 2.5D map, in one embodiment.

FIG. 2B illustrates a reference 2D map and the viewpoint of the mobile device, in one embodiment. In some embodiments the 2D map (e.g., map 216, features 217, and viewpoint 221) is a topographical map and is used as input to create a 2.5D map. The topographical map may be an untextured 2D map. In some embodiments, a mobile device can approximate the height of one or more objects (e.g., buildings or structures) in the 2D environment using LIDAR or other methods. The reference 2D map may be a retrieved city map and may optionally with building façade outlines. Each building façade in a 2.5D map may have an attached/associated height value. In some embodiments a 3D map is obtained instead of or in addition to the 2.5D map. For example, aspects from multiple maps may be combined into a single reference map.

Figure 2C:
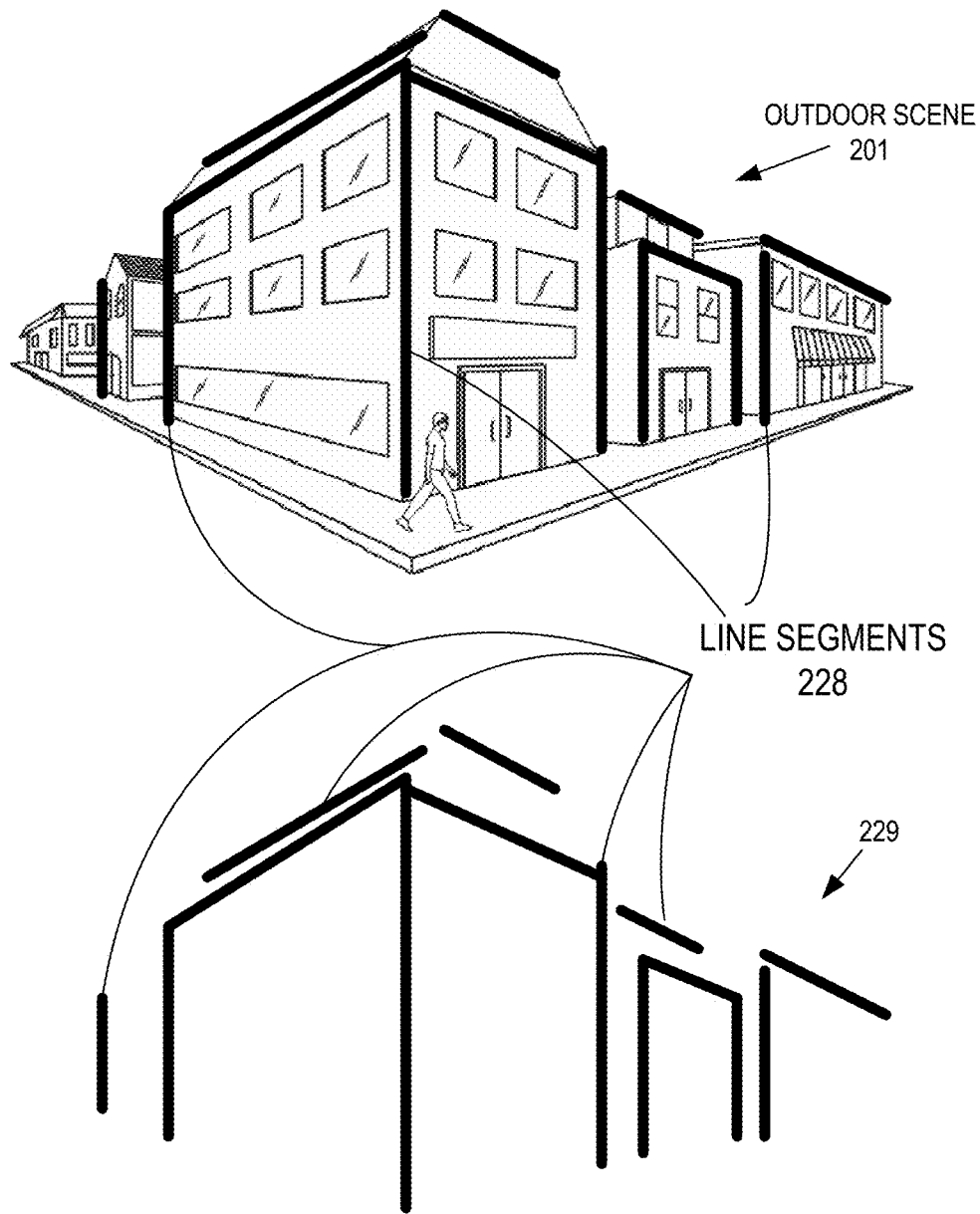
FIG. 2C illustrates a static representation of the real world environment with line feature segmentation, in one embodiment.

FIG. 2C illustrates a static representation of the real world environment with line features (e.g., as described above with reference to FIG. 1 at least in regards to block 137), in one embodiment. For example, line segments 228 may be determined according to one or more of: length, relationship to a horizon, projection angle, or any combination thereof. Scene 201 is illustrated as a reference at the top of FIG. 2C with line segments 228 as an overlay. For comparison, line segments 228 are isolated at 229 without the scene 201 reference at the bottom of FIG. 2C at 229.

Figure 2D:
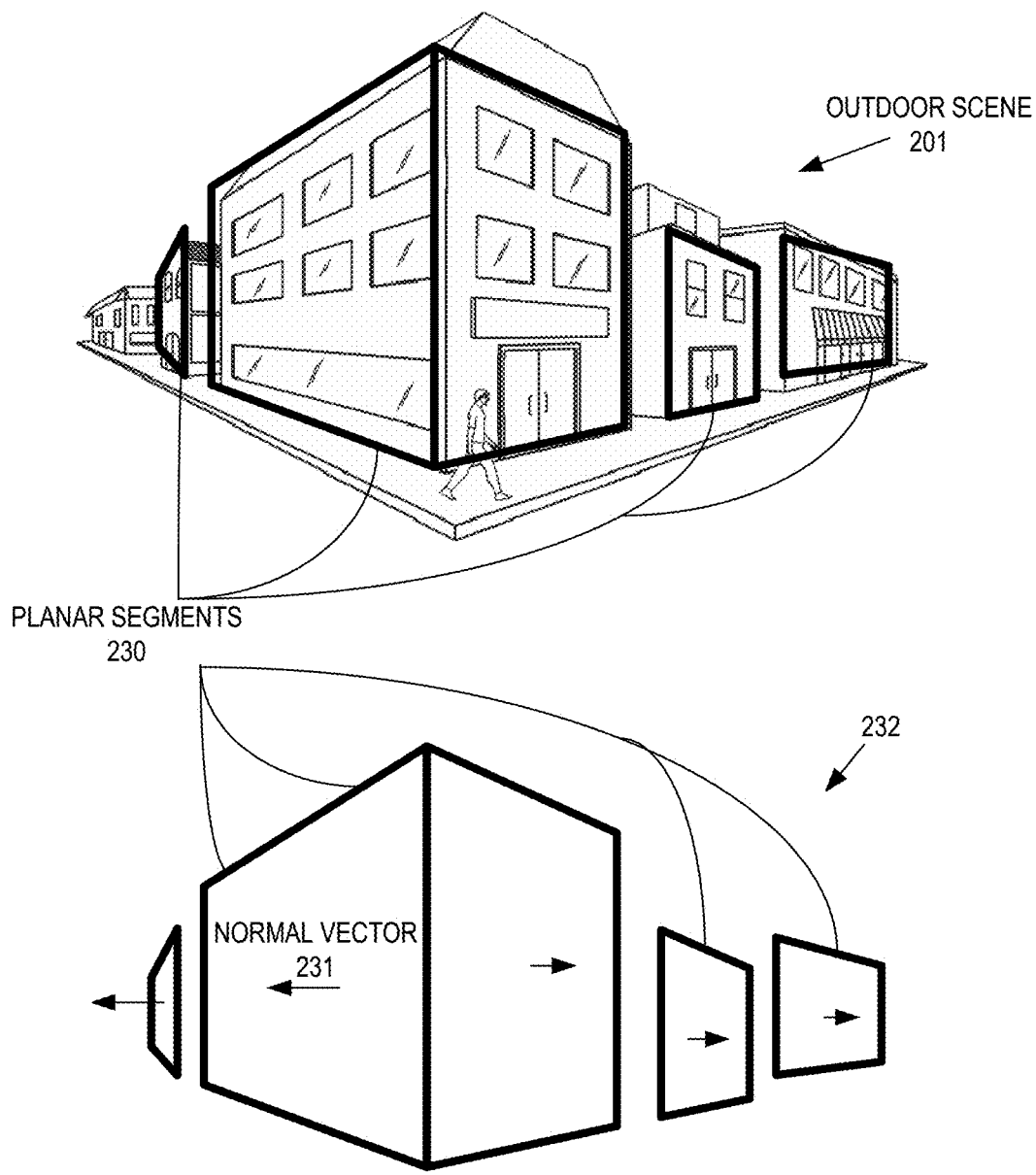
FIG. 2D illustrates a static representation of the real world environment with planar structure segmentation, in one embodiment.

FIG. 2D illustrates a static representation of the real world environment with planar structures (e.g., as described above with reference to FIG. 1 at least in regards to block 135), in one embodiment. For example, planar structure segments 230 may be determined by identifying the normal vectors (e.g., normal vector 231) of pixels within the planar structures. Scene 201 is illustrated as a reference at the top of FIG. 2D with planar segments 230 as an overlay. For comparison, planar segments 230 are isolated at 232 without the scene 201 reference at the bottom of FIG. 2D.

Figure 2E:
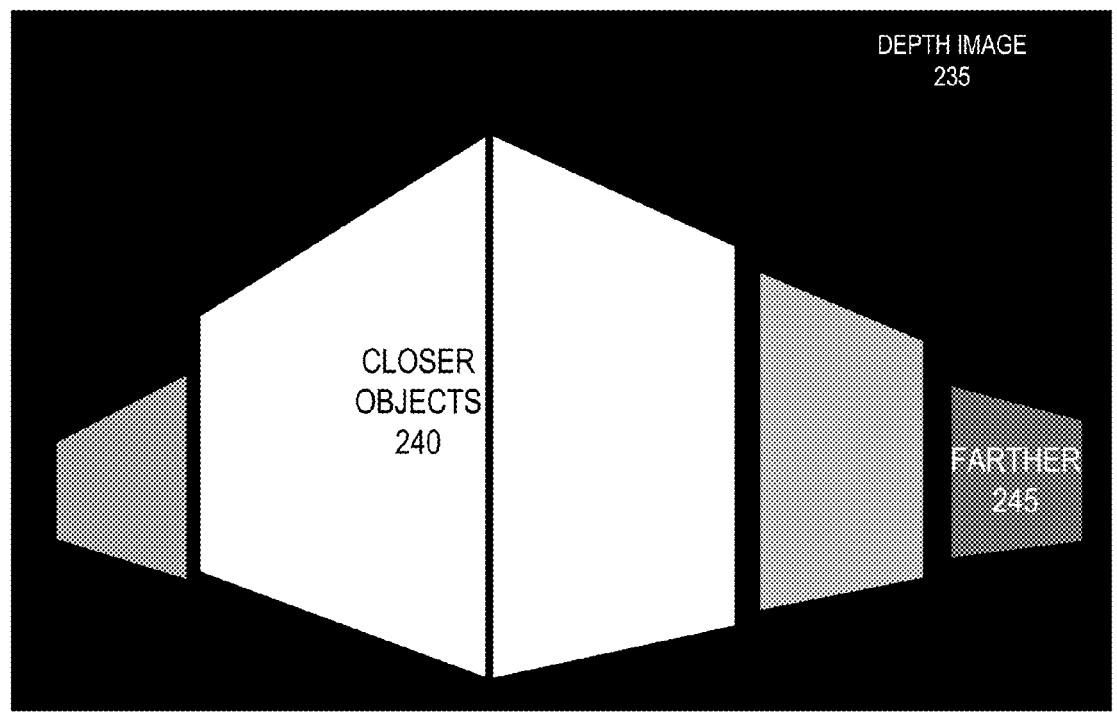
FIG. 2E illustrates a static representation of the real world environment with depth values for pixels within the input image, in one embodiment.

FIG. 2E illustrates a static representation of the real world environment with depth values for pixels within the input image (e.g., as described above with reference to FIG. 1, at least in regards to block 139), in one embodiment. For example, pixel values closer to the camera viewpoint are represented by values closer to white (closer building section 240), and pixel values farther from the camera viewpoint are represented by values closer to black (farther building section 245).

Figure 3:
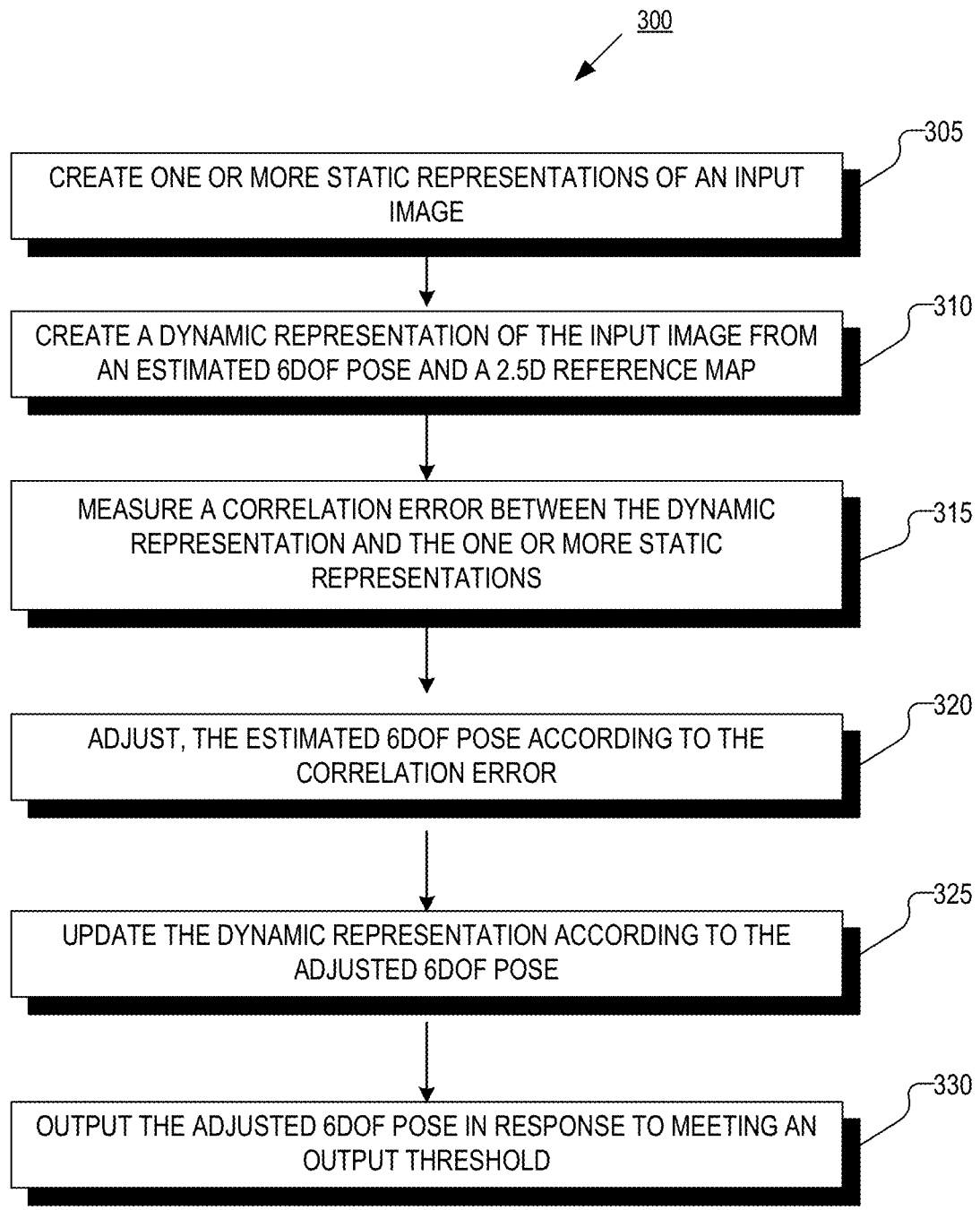
FIG. 3 is a flowchart illustrating a method for a device to determine 6DOF pose, in another embodiment.

FIG. 3 is a flowchart illustrating a method to determine 6DOF pose, in another embodiment. At block 305, method 300 (e.g., implemented by a mobile device or 6DOF pose detection module/engine) creates one or more static representations of an input image. In some embodiments, the device captures an image (e.g., from a camera sensor which may be RGB, depth, thermal or other image camera) and associates one or more types of mobile device sensor data with the time of image capture. For example, the image may be tagged with satellite positioning system coordinates, accelerometer data, compass heading, magnetometer readings, gyroscope data, or any combination thereof. In one embodiment, the one or more static representations are created from one or more of: segmenting parts of the image into respective classes, segmenting the image into planar structures, line features determined by segmenting the input image into lines, estimating depth for each pixel within the image, or any combination thereof. In some embodiments, if method 300 is correlating a plurality of different static representations, each static representation may be configured with a static representation correlation weight (e.g., determined by a preconfigured configuration setting or by heuristic).

At block 310, the method creates a dynamic representation of the input image from an estimated 6DOF pose and a 2.5D reference map. The estimated 6DOF pose may be calculated from one or more of: a satellite positioning system, accelerometer, compass, magnetometer, gyroscope, or any combination thereof. The 2.5D reference map may be determined from estimating the camera location within a 2D map and determining or receiving object height data for one or more objects within the environment. In some embodiments, the reference map may be a 3D reference map such as a CAD (computer-aided drafting) drawing map or other map created separately or independently from the method 300.

The dynamic representation of the input image may be created such that it is compatible (i.e., capable of or enabled for correlation with) the one or more static representations from block 305. For example, if a static representation includes depth data, the dynamic representation to be correlated with the static representation may include depth data. Therefore, in some embodiments, the dynamic representation may include multiple different types of data if a plurality of static representations are to be correlated. In other embodiments, a different and separate dynamic representation is assigned or associated with each different type of static representation. However, in either case, regardless of whether there are one or more static representations, each static representation will be set/defined at block 305. In contrast, the dynamic representation may change according to the particular estimated 6DOF pose for which the dynamic representation is based upon.

At block 315, the method measures a correlation error between the dynamic representation and the one or more static representations. For example, if a depth map is created as a static representation for use in method 300, the dynamic representation may include depth data such that a correlation between the depth map of the dynamic representation and depth map of the static representation yields a correlation measurement result. The correlation measurement result may be interpreted as a correlation error representing an error difference between an ideal or target result and the correlation measurement result. In some embodiments the ideal or target result is for a greater correlation, however less correlation may also be desirable in some embodiments. In some embodiments, each type of static representation may have a different correlation error threshold configuration. For example static representation "A" may have a relatively low correlation error when "A" is highly correlated to the dynamic representation. In contrast static representation "B" may have a relatively high correlation error when "B" is highly correlated to the dynamic representation. Furthermore, each static representation may be individually weighted such that correlation of multiple static representations to the dynamic representation is possible. In one embodiment, a convolutional neural network is utilized to determine correlation between the dynamic representation and the one or more static representations of the input image.

At block 320, the method adjusts the estimated 6DOF pose according to the correlation error. In some embodiments, the particular adjustment depends on the type of static representation to correlate and the correlation error. Data from a static representation may be correlated with data of the dynamic representation and adjustments may be in units and amount to best estimate 6DOF pose (i.e. reduce correlation error) between the data from the static and dynamic representations. For example, if the static representation determined at block 305 includes an image segmented into classes (e.g., as previously described in block 131 of FIG. 1), the dynamic representation may be a binary representation of the scene with data values to show whether there is or is not a façade. If the static representation includes planar structures (e.g., as previously described in block 135 of FIG. 1), method 300 may correlate the planar structures to vector fields of the dynamic representation. If the static representation is a line feature (e.g., as previously described in block 137 of FIG. 1) method 300 may perform histogram stretching and correlation between line features of the dynamic and static representations. If the static representation is a depth map (e.g., as previously described in block 139 of FIG. 1) method 300 may correlate the depth data of the static representation with depth data of the dynamic representation. In other embodiments, different combinations and types of static and dynamic representations are possible within the method 300's framework to iteratively improve upon an estimated 6DOF pose by adjusting the dynamic representation and correlating to the dynamic representation with one or more static representations.

At block 325, the method updates the dynamic representation according to the adjusted 6DOF pose. In one embodiment a 6DOF pose may be determined with a minimum amount of globally available input information, such as a 2D map and some building height information (e.g., as provided by a 2.5D untextured map). The building height information may be estimated from the input image scene or determined from other sources. In some embodiments, method 300 may utilize more detailed and accurate models and semantic information for enhanced results. For example, within an AR system synergies can be exploited for annotated content to be visualized which may be used as feedback into the method 300 to improve localization performance. For example, using the AR annotations of windows or doors can be used in connection to a window detector to add another semantic class to a scoring function. Therefore, certain AR content might be used to improve localization performance within method 300's framework.

At block 330, the method outputs the adjusted 6DOF pose in response to meeting an output threshold. In one embodiment, the output threshold includes one or more of: a correlation error meeting an error threshold, an iteration count is met, or any combination thereof. For example, a final adjusted/refined 6DOF pose may be determined when the predictor-corrector loop has been performed a set number of iterations, and/or when a correlation error is within an acceptable threshold. The iteration count may ensure the method does not loop continuously and will eventually exit while the correlation error threshold may provide an output when the 6DOF is estimated to be within threshold accuracy.

Figure 4:
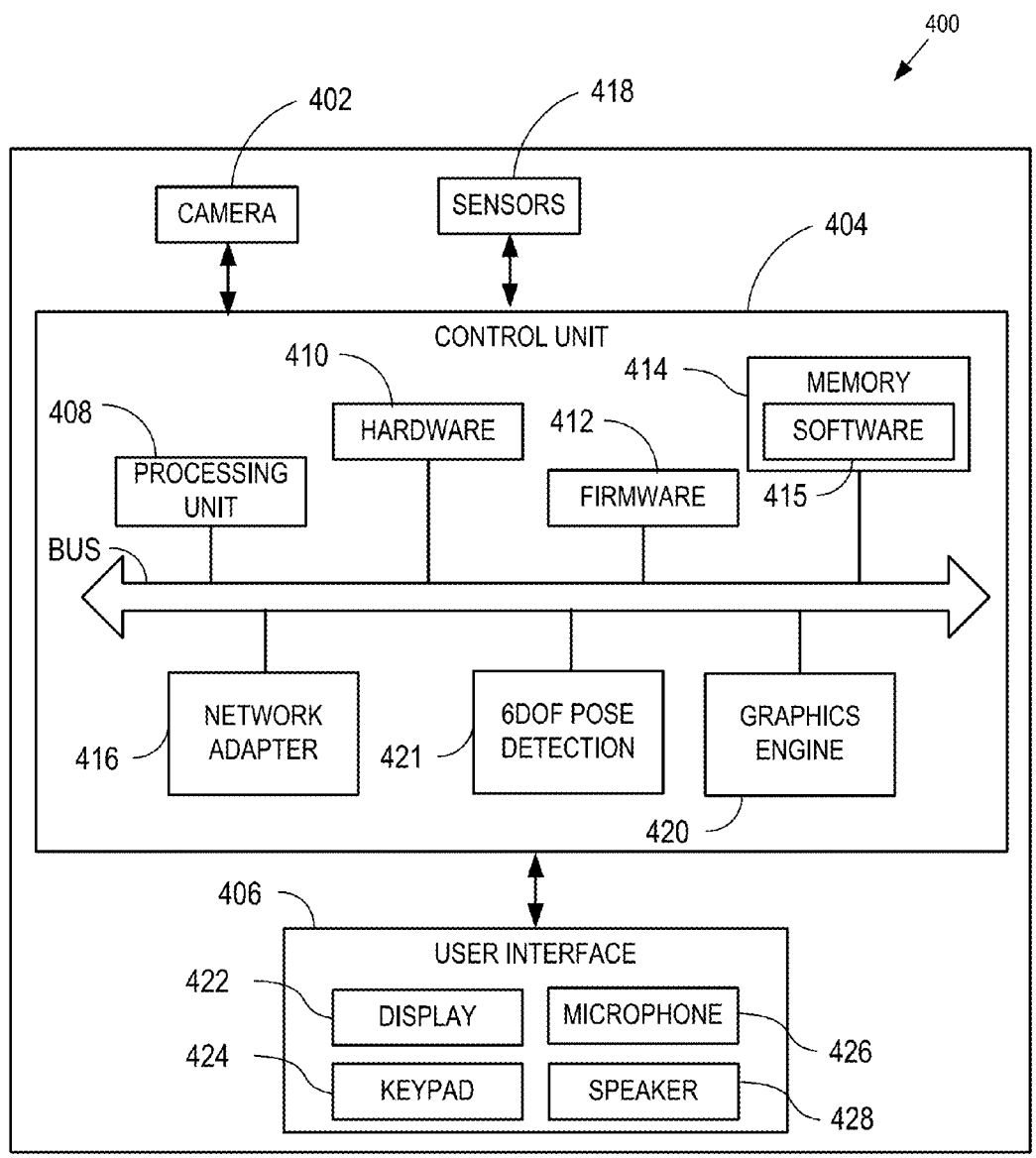
FIG. 4 is a functional block diagram of an exemplary mobile device capable of performing the processes discussed herein.

FIG. 4 is a functional block diagram of a mobile device 400 capable of determining 6DOF pose, in one embodiment. As used herein, a mobile device (e.g., mobile device 400) refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile device" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile device" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. In addition a "mobile device" may also include all electronic devices which are capable of augmented reality (AR), virtual reality (VR), and/or mixed reality (MR) applications. Any operable combination of the above are also considered a "mobile device."

Mobile device 400 may optionally include a camera 402 as well as an optional user interface 406 that includes the display 422 capable of displaying images captured by the camera 402. In some embodiments, camera 402 is a RGB camera, depth camera, or thermal imaging camera. User interface 406 may also include a keypad 424 or other input device through which the user can input information into the mobile device 400. If desired, the keypad 424 may be obviated by integrating a virtual keypad into the display 422 with a touch sensor. User interface 406 may also include a microphone 426 and speaker 428.

Mobile device 400 also includes a control unit 404 that is connected to and communicates with the camera 402 and user interface 406, if present. The control unit 404 accepts and processes images received from the camera 402 and/or from network adapter 416. Control unit 404 may be provided by a processing unit 408 and associated memory 414, hardware 410, software 415, and firmware 412.

Control unit 404 may further include a graphics engine 420, which may be, e.g., a gaming engine, to render desired data in the display 422, if desired. Processing unit 408 and graphics engine 420 are illustrated separately for clarity, but may be a single unit and/or implemented in the processing unit 408 based on instructions in the software 415 which is run in the processing unit 408. Processing unit 408, as well as the graphics engine 420 can, but need not necessarily include, one or more microprocessors, embedded processors, controllers, application specific integrated circuits (ASICs), digital signal processors (DSPs), and the like. In some embodiments, control unit 404 may further include sensor(s) 418 (e.g., device sensors), which may include a magnetometer, gyroscope, accelerometer, light sensor, satellite positioning system, and other sensor types or receivers. The terms processor and processing unit describes the functions implemented by the system rather than specific hardware. Moreover, as used herein the term "memory" refers to any type of computer storage medium, including long term, short term, or other memory associated with mobile device 400, and is not to be limited to any particular type of memory or number of memories, or type of media upon which memory is stored.

The processes described herein may be implemented by various means depending upon the application. For example, these processes may be implemented in hardware 410, firmware 412, software 415, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the processes described herein may be implemented with modules, procedures, or engines that perform aspects of 6DOF pose detection described herein (e.g., as illustrated and described in the methods of FIG. 1 and FIG. 3). Any non-transitory computer-readable medium tangibly embodying instructions may be used in implementing the processes described herein. For example, program code may be stored in memory 414 and executed by the processing unit 408. Memory may be implemented within or external to the processing unit 408. In some embodiments, code or aspects of the methods and processes described (e.g., at least methods of FIG. 1 and FIG. 3) above may be implemented in 6DOF detection module 421.

If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, Flash Memory, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 5:
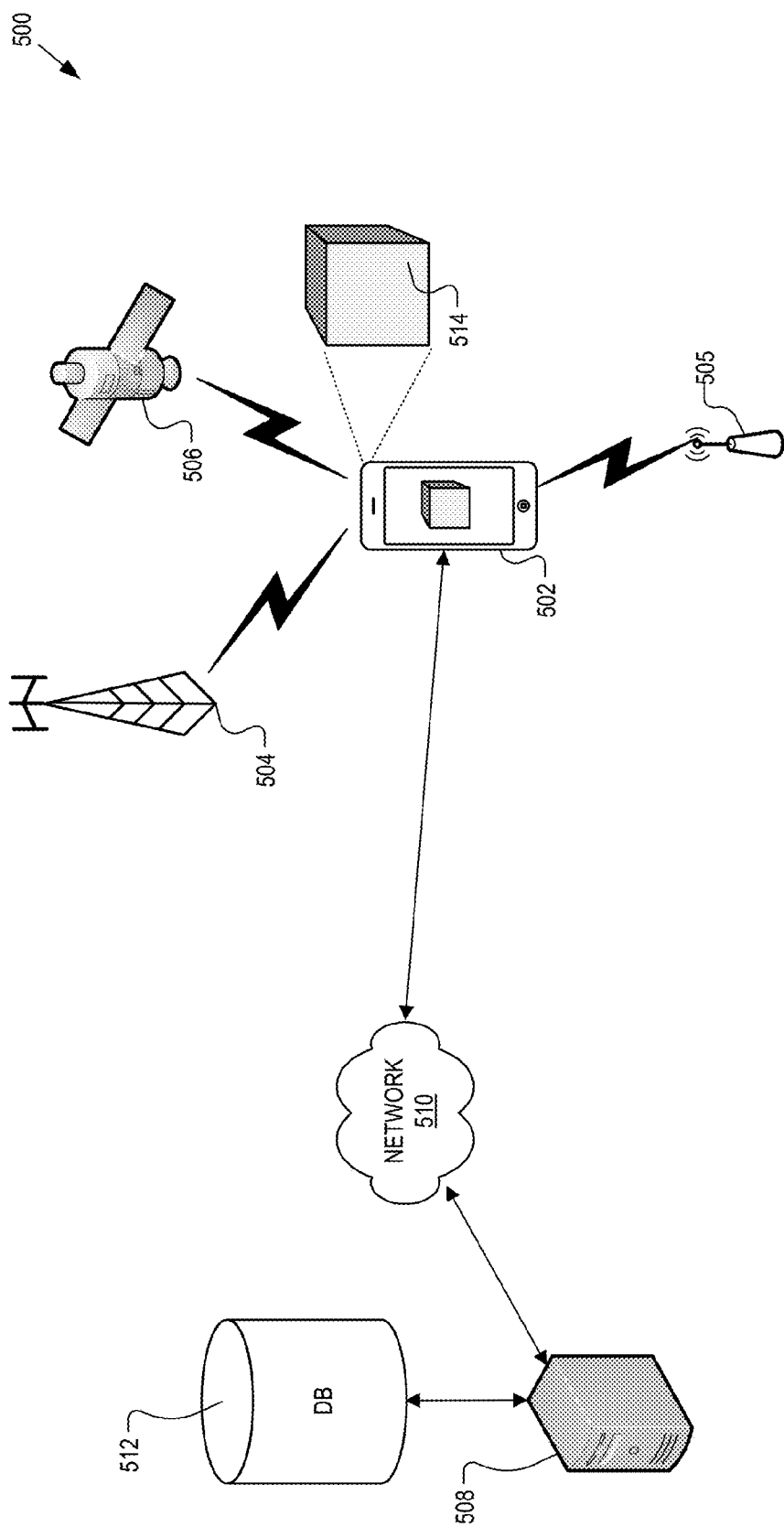
FIG. 5 is a functional block diagram of an image processing system, in one embodiment.

FIG. 5 is a functional block diagram of an image processing system 500 capable of determining 6DOF pose of an image, in one embodiment. As illustrated, system 500 includes an example mobile device 502 that includes a camera (not shown in current view) capable of capturing images of a scene including object/environment 514. Database 512 may include data, including map data (e.g., 2D, 2.5D, or 3D map data).

The mobile device 502 may include a display to show images captured by the camera. The mobile device 502 may also be used for navigation based on, e.g., determining its latitude and longitude using signals from a satellite positioning system (SPS), which includes satellite vehicle(s) 506, or any other appropriate source for determining position including cellular tower(s) 504 or wireless communication access points 705. The mobile device 502 may also include orientation sensors, such as a digital compass, accelerometers or gyroscopes, which can be used to determine the orientation of the mobile device 502.

A SPS typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs) 506. For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass).

In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The mobile device 502 is not limited to use with an SPS for position determination, as position determination techniques may be implemented in conjunction with various wireless communication networks, including cellular towers 504 and from wireless communication access points 505, such as a wireless wide area network (WWAN), a wireless local area network (WLAN), a wireless personal area network (WPAN). Further the mobile device 502 may access one or more servers 508 to obtain data, such as online and/or offline map data from a database 512, using various wireless communication networks via cellular towers 504 and from wireless communication access points 505, or using satellite vehicles 506 if desired. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE (Institute of Electrical and Electronics Engineers) 802.11x network, and a WPAN may be a Bluetooth network, an IEEE 802.15x, or some other type of network. The techniques may also be implemented in conjunction with any combination of WWAN, WLAN and/or WPAN.

As shown in FIG. 5, system 500 includes mobile device 502 capturing an image of object/scene and determining a 6DOF pose. As illustrated in FIG. 5, the mobile device 502 may access a network 510, such as a wireless wide area network (WWAN), e.g., via cellular tower 504 or wireless communication access point 505, which is coupled to a server 508, which is connected to database 512 that stores information related to target objects and may also include untextured models (e.g., 2D or 2.5D maps) of a geographic area as discussed above with reference to FIG. 1 and FIG. 3. While FIG. 5 shows one server 508, it should be understood that multiple servers may be used, as well as multiple databases 512. In some embodiments, mobile device 502 may not utilize a server and instead perform 6DOF pose determination entirely locally on the mobile device. In some embodiments, mobile device 502 retrieves at least a portion of the database 512 from server 508 and stores the downloaded map data locally at the mobile device 502. The portion of a database obtained from server 508 may be based on the mobile device's geographic location as determined by the mobile device's positioning system. Moreover, the portion of the database obtained from server 508 may depend upon the particular application that requires the database on the mobile device 502. By downloading a small portion of the database 512 based on the mobile device's geographic location and performing the object detection on the mobile device 502, network latency issues may be avoided and the over the air (OTA) bandwidth usage is reduced along with memory requirements on the client (i.e., mobile device) side. If desired, however, the object detection and tracking may be performed by the server 508 (or other server), where either the query image itself or the extracted features from the query image are provided to the server 508 by the mobile device 502. In one embodiment, online map data is stored locally by mobile device 502, while offline map data is stored in the cloud in database 512.

The order in which some or all of the process blocks appear in each process discussed above should not be deemed limiting. Rather, one of ordinary skill in the art having the benefit of the present disclosure will understand that some of the process blocks may be executed in a variety of orders not illustrated.

Those of skill would further appreciate that the various illustrative logical blocks, modules, engines, circuits, and algorithm steps described in connection with the embodiments disclosed herein may be implemented as electronic hardware, computer software, or combinations of both. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Various modifications to the embodiments disclosed herein will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computer-implemented method for determining a 6DOF camera pose, the method comprising:
   creating one or more static representations of an input image;
   creating a dynamic representation of the input image from an estimated 6DOF pose and a 2.5D reference map, wherein the 2.5D reference map is determined from estimating a camera location within a 2D map and determining or receiving object height data for one or more objects within the input image;
   measuring a correlation error between the dynamic representation and the one or more static representations;
   adjusting the estimated 6DOF pose according to the correlation error;
   updating the dynamic representation according to the adjusted 6DOF pose; and
   outputting the adjusted 6DOF pose in response to meeting an output threshold.

2. The computer-implemented method of claim 1, wherein the one or more static representations includes one or more of:
   class segments determined by segmenting parts of the input image into respective classes,
   planar structures determined by segmenting the input image into planar structures,
   line features determined by segmenting the input image into lines,
   a depth map determined by estimating depth for each pixel within the image, or
   any combination thereof.

3. The computer-implemented method of claim 1, wherein the output threshold is met when:
   the correlation error is within an error threshold,
   an iteration count is met, or
   a combination thereof.

4. The computer-implemented method of claim 1, further comprising:
   iteratively updating the dynamic representation according to adjusted estimated 6DOF poses, and measuring the correlation error until meeting the output threshold.

5. The computer-implemented method of claim 1, wherein a convolutional neural network determines correlation between the dynamic representation and the one or more static representations of the input image.

6. A non-transitory computer-readable medium including program code stored thereon for determining a 6DOF pose of an image, the program code comprising instructions to:

create one or more static representations of an input image;
create a dynamic representation of the input image from an estimated 6DOF pose and a 2.5D reference map, wherein the 2.5D reference map is determined from estimating a camera location within a 2D map and determining or receiving object height data for one or more objects within the input image;
measure a correlation error between the dynamic representation and the one or more static representations;
adjust the estimated 6DOF pose according to the correlation error;
update the dynamic representation according to the adjusted 6DOF pose; and
output the adjusted 6DOF pose in response to meeting an output threshold.

7. The medium of claim 6, wherein the one or more static representations includes one or more of:
class segments determined by segmenting parts of the input image into respective classes,
planar structures determined by segmenting the input image into planar structures,
line features determined by segmenting the input image into lines,
a depth map determined by estimating depth for each pixel within the image, or
any combination thereof.

8. The medium of claim 6, wherein the output threshold is met when:
the correlation error is within an error threshold,
an iteration count is met, or
a combination thereof.

9. The medium of claim 6, further comprising:
iteratively updating the dynamic representation according to adjusted estimated 6DOF poses, and measuring the correlation error until meeting the output threshold.

10. The medium of claim 6, wherein a convolutional neural network determines correlation between the dynamic representation and the one or more static representations of the input image.

11. A mobile device, comprising:
memory adapted to store program code for determining a 6DOF pose of an image;
a processing unit configured to access and execute instructions included in the program code, wherein when the instructions are executed by the processing unit, the processing unit directs the mobile device to:
create one or more static representations of an input image;
create a dynamic representation of the input image from an estimated 6DOF pose and a 2.5D reference map, wherein the 2.5D reference map is determined from estimating a camera location within a 2D map and determining or receiving object height data for one or more objects within the input image;
measure a correlation error between the dynamic representation and the one or more static representations;
adjust the estimated 6DOF pose according to the correlation error;
update the dynamic representation according to the adjusted 6DOF pose; and
output the adjusted 6DOF pose in response to meeting an output threshold.

12. The device of claim 11, wherein the one or more static representations include one or more of:
class segments determined by segmenting parts of the input image into respective classes,
planar structures determined by segmenting the input image into planar structures,
line features determined by segmenting the input image into lines,
a depth map determined by estimating depth for each pixel within the image, or
any combination thereof.

13. The device of claim 11, wherein the output threshold is met when:
the correlation error is within an error threshold,
an iteration count is met, or
a combination thereof.

14. The device of claim 11, further comprising instructions to:
iteratively update the dynamic representation according to adjusted estimated 6DOF poses, and measuring the correlation error until meeting the output threshold.

15. The device of claim 11, wherein a convolutional neural network determines correlation between the dynamic representation and the one or more static representations of the input image.

16. An apparatus, comprising:
means for creating one or more static representations of an input image;
means for creating a dynamic representation of the input image from an estimated 6DOF pose and a 2.5D reference map, wherein the 2.5D reference map is determined from estimating a camera location within a 2D map and determining or receiving object height data for one or more objects within the input image;
means for measuring a correlation error between the dynamic representation and the one or more static representations;
means for adjusting the estimated 6DOF pose according to the correlation error;
means for updating the dynamic representation according to the adjusted 6DOF pose; and
means for outputting the adjusted 6DOF pose in response to meeting an output threshold.

17. The apparatus of claim 16, wherein the one or more static representations includes one or more of:
class segments determined by segmenting parts of the input image into respective classes,
planar structures determined by segmenting the input image into planar structures,
line features determined by segmenting the input image into lines,
a depth map determined by estimating depth for each pixel within the image, or
any combination thereof.

18. The apparatus of claim 16, wherein the output threshold is met when:
the correlation error is within an error threshold,
an iteration count is met, or
a combination thereof.

19. The apparatus of claim 16, further comprising:
iteratively updating the dynamic representation according to adjusted estimated 6DOF poses, and measuring the correlation error until meeting the output threshold.

20. The apparatus of claim 16, wherein a convolutional neural network determines correlation between the dynamic representation and the one or more static representations of the input image.

* * * * *